United States Patent
Niemoeller

(10) Patent No.: US 9,571,360 B2
(45) Date of Patent: Feb. 14, 2017

(54) METHOD AND SCORE MANAGEMENT NODE FOR SUPPORTING SERVICE EVALUATION

(71) Applicant: Telefonaktiebolaget L M Ericsson (publ), Stockholm (SE)

(72) Inventor: Joerg Niemoeller, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 160 days.

(21) Appl. No.: 14/611,474

(22) Filed: Feb. 2, 2015

(65) Prior Publication Data
US 2016/0226733 A1 Aug. 4, 2016

(51) Int. Cl.
H04W 72/08 (2009.01)
H04L 12/26 (2006.01)
H04M 1/24 (2006.01)
H04L 12/24 (2006.01)

(52) U.S. Cl.
CPC .......... *H04L 43/08* (2013.01); *H04L 41/0631* (2013.01); *H04L 41/5067* (2013.01)

(58) Field of Classification Search
CPC .... G06Q 10/06395; H04L 43/08; H04L 43/06
USPC ...................................... 379/29.09
See application file for complete search history.

(56) References Cited

U.S. PATENT DOCUMENTS

2013/0266126 A1* 10/2013 Dunne ............... H04M 3/2227
379/32.01

FOREIGN PATENT DOCUMENTS

GB    EP 1447940 A2 *  8/2004  ......... H04L 12/2697

* cited by examiner

*Primary Examiner* — Parth Patel
*Assistant Examiner* — Jason Harley
(74) *Attorney, Agent, or Firm* — Patent Portfolio Builders, PLLC

(57) ABSTRACT

A score management node receives network measurements related to at least one service event when the service is delivered to the user, and determines, in a first scoring module, a quality score Q reflecting the user's perception of quality of the delivered service and an associated significance S reflecting the user's perception of importance of the delivered service, based on the received network measurements. The determined quality score Q and associated significance S of each service event are modified in a succession of intermediate scoring modules, based on a predefined influence factor applied in each intermediate scoring module. The perception score P is further calculated in a concluding scoring module, based on the modified quality score and associated modified significance, wherein the calculated perception score P is made available for use in the service evaluation.

23 Claims, 5 Drawing Sheets

| Service type | Significance Sum | Number Scorings | Average Significance |
|---|---|---|---|
| T1 (video session) | S1 = 30 | 3 | 10 |
| T2 (voice call) | S2 = 30 | 15 | 2 |
| T3 (web access time) | S3 = 20 | 1 | 20 |
| T4 (web download time) | S4 = 12 | 1 | 12 |

| Service event | Significance | Time | KPI |
|---|---|---|---|
| video session | S = 30 | 10:13 | Frame-rate 10fps, 5 times re-buffering |
| web session | S = 19 | 9:20 | Web page download time 30 sec |
| web session | S = 13 | 13:10 | Web page access time 10 sec |
| file download | S = 10 | 8:01 | Data-rate 20 kbps |
| video session | S = 9 | 11:10 | 2 times re-buffereing |

Fig. 8

| Service Type | Significance Sum | Number Scorings | Average Significance |
|---|---|---|---|
| T1 (video session) | S1 = 30 | 3 | 10 |
| T2 (voice call) | S2 = 30 | 15 | 2 |
| T3 (web access time) | S3 = 20 | 1 | 20 |
| T4 (web download time) | S4 = 12 | 1 | 12 |
| | | | |
| Device Type | Significance Sum | Number Scorings | Average Significance |
| Smartphone | S = 300 | 20 | 15 |
| Tablet | S = 10 | 10 | 1 |
| Laptop | S = 0 | 0 | 0 |
| | | | |
| Access Type | Significance Sum | Number Scorings | Average Significance |
| 2G | S = 30 | 3 | 10 |
| 3G | S = 30 | 15 | 2 |
| LTE | S = 20 | 1 | 20 |
| | | | |
| Cell ID | Significance Sum | Number Scorings | Average Significance |
| 124221 | S1 = 50 | 25 | 2 |
| 123443 | S2 = 6 | 3 | 2 |
| 776575 | S = 1 | 1 | 1 |

Fig. 9

METHOD AND SCORE MANAGEMENT NODE FOR SUPPORTING SERVICE EVALUATION

TECHNICAL FIELD

The present disclosure relates generally to a method and a score management node for supporting service evaluation by obtaining a perception score P reflecting a user's experience of a service delivered by means of a telecommunication network.

BACKGROUND

When a service has been delivered by means of a telecommunication network by a service provider to one or more users, it is of interest for the service provider to know whether the user is satisfied with the delivered service or not, e.g. to find out if the service has shortcomings that need to be improved in some way to make it more attractive to this user and to other users. Service providers, e.g. network operators, are naturally interested in making their services as attractive as possible to users in order to increase sales, and a service may therefore be designed and developed so as to meet the users' demands and expectations as far as possible. It is therefore useful to gain knowledge about the users' opinion after service delivery in order to evaluate the service. The services discussed in this disclosure may, without limitation, be related to streaming of audio and visual content e.g. music and video, on-line games, web browsing, file downloads, voice and video calls, delivery of information e.g. in the form of files, images and notifications, and so forth, i.e. any service that can be delivered by means of a telecommunication network.

A normal way to obtain the users' opinion about a delivered service is to explicitly ask the customer, after delivery, to answer certain questions about the service in a survey or the like. For example, the service provider may send out or otherwise present an inquiry form, questionnaire or opinion poll to the customer with various questions related to user satisfaction of the service and its delivery. If several users respond to such a poll or questionnaire, the results can be used for evaluating the service, e.g. for finding improvements to make, provided that the responses are honest and that a significant number of users have answered. An example of using survey results for estimating the opinion of users is the so-called Net Promoter Score, NPS, which is calculated from answers to user surveys to indicate the users' collected opinions expressed in the survey answers.

However, it is often difficult to motivate a user to take the time and trouble to actually answer the questions and send a response back to the service provider. Users are often notoriously reluctant to provide their opinions on such matters, particularly in view of the vast amounts of information and questionnaires flooding users in the current modern society. One way to motivate the user is to reward him/her in some way when submitting a response, e.g. by giving some present or a discount either on the purchased services or when buying future services, and so forth.

Even so, it is a problem that surveys can in practice only be conducted for a limited number of users which may not be representative for all users of a service, and that the feedback cannot be obtained in "real-time", that is immediately after service delivery. A survey should not be sent to a user too frequently either. The obtained feedback may thus get out-of-date.

Further problems include that considerable efforts must be spent to distribute a survey to a significant but still limited number of users and to review and evaluate all answers coming in, sometimes with poor results due to low responsiveness. Furthermore, the user may provide opinions which are not really accurate or honest and responses to surveys may even be misleading. For example, the user is often prone to forget how the service was actually perceived or experienced when it was delivered, even after a short while, once prompted to respond to a questionnaire. Human memory thus tends to change over time, and the response given may not necessarily reflect what the user really felt and thought at service delivery. The user may further provide the response very hastily and as simply as possible not caring much if it really reflects their true opinion. The opinion expressed may also be dependent on the user's current mood such that different opinions may be expressed at different occasions, making the response all the more erratic and unreliable.

Still another problem is that it can be quite difficult to trace an underlying reason why users have been dissatisfied with a particular service, so as to take actions to eliminate the fault and improve the service and/or the network used for its delivery. Tracing the reason for such dissatisfaction may require that any negative opinions given by users need to be correlated with certain operational specifics related to network performance, e.g. relating to where, when and how the service was delivered to these users. This kind of information is not generally available and analysis of the network performance must be done manually by looking into usage history and history of network issues. Much efforts and costs are thus required to enable tracing of such faults and shortcomings.

SUMMARY

It is an object of embodiments described herein to address at least some of the problems and issues outlined above. It is possible to achieve this object and others by using a method and a score management node as defined in the attached independent claims.

According to one aspect, a method is performed by a score management node for supporting service evaluation by obtaining a perception score P reflecting a user's experience of a service delivered by means of a telecommunication network. In this method, the score management node receives network measurements related to at least one service event when the service is delivered to the user. The score management node comprises functional scoring modules which are used as follows.

The score management node determines, in a first scoring module, a quality score Q reflecting the user's perception of quality of the delivered service and an associated significance S reflecting the user's perception of importance of the delivered service, based on the received network measurements. The score management node then modifies, in a succession of intermediate scoring modules, the determined quality score Q and associated significance S of each service event based on a predefined influence factor applied in each intermediate scoring module. The score management node then calculates, in a concluding scoring module, the perception score P based on the modified quality score Qm and associated modified significance Sm, wherein the calculated perception score P is made available for use in the service evaluation.

According to another aspect, a score management node is arranged to support service evaluation by obtaining a perception score P reflecting a user's experience of a service delivered by means of a telecommunication network. the score management node comprises a processor and a memory containing instructions executable by the processor, whereby the score management node is configured to:

receive network measurements related to at least one service event when the service is delivered to the user, determine, in a first scoring module, a quality score Q reflecting the user's perception of quality of the delivered service and an associated significance S reflecting the user's perception of importance of the delivered service, based on the received network measurements, modify, in a succession of intermediate scoring modules, the determined quality score Q and associated significance S of each service event based on a predefined influence factor applied in each intermediate scoring module, and calculate, in a concluding scoring module, the perception score P based on the modified quality score Qm and associated modified significance Sm, wherein the calculated perception score P is made available for use in the service evaluation.

Thereby, the perception score P can be used in the service evaluation as an estimation of the users' opinion and it is possible to obtain P automatically after every time a service is delivered to the user. Further, the perception score P is calculated from technical measurements in the network related to the service usage which are readily available for any user and it is thus not necessary to depend on the user to answer a survey or the like.

The above method and score management node may be configured and implemented according to different optional embodiments to accomplish further features and benefits, to be described below.

A computer program storage product is also provided comprising instructions which, when executed on at least one processor in the score management node, cause the at least one processor to carry out the method described above for the score management node.

BRIEF DESCRIPTION OF DRAWINGS

The solution will now be described in more detail by means of exemplary embodiments and with reference to the accompanying drawings, in which:

FIG. 8 is an example of a significance table sorting five services of the highest significance S, according to further possible embodiments.

FIG. 9 is another example of a significance table with different sub-tables sorting services, device types, access types and Cell identities of the highest significance S, according to further possible embodiments.

DETAILED DESCRIPTION

Figure 1:
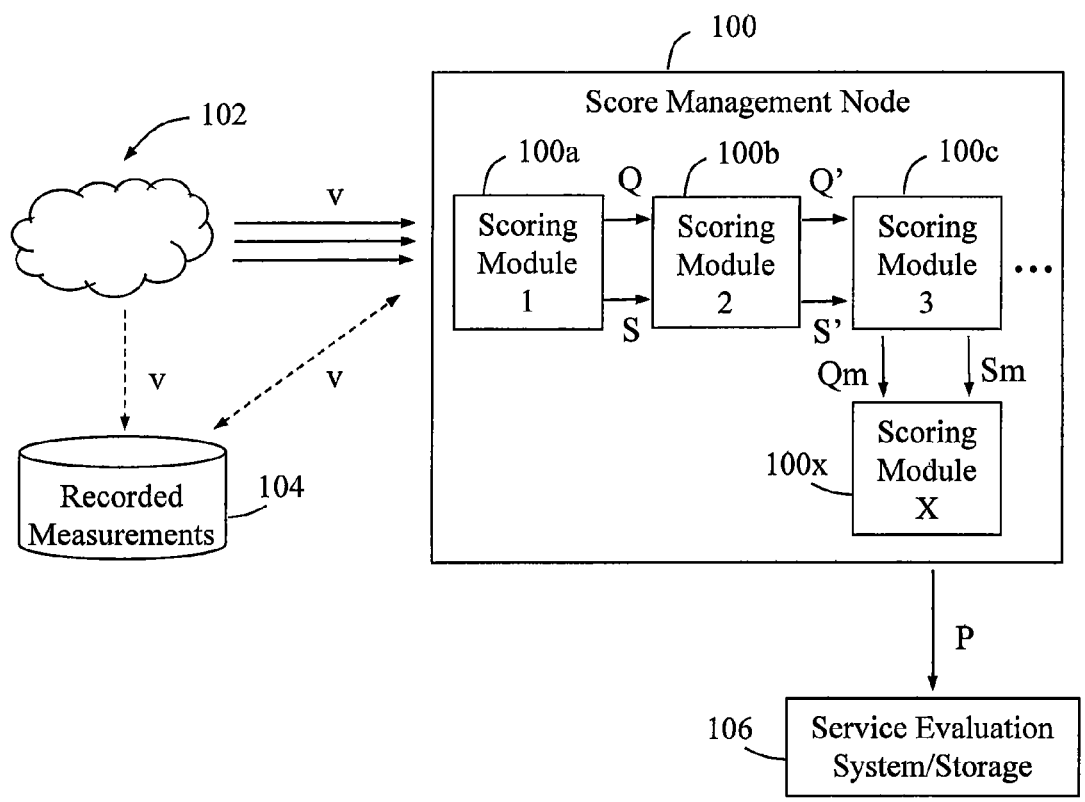
FIG. 1 is a block diagram illustrating an example of how a score management node may be configured and operate, according to some possible embodiments.

The embodiments described in this disclosure can be used for supporting evaluation of a service by obtaining an estimated user opinion about the service when it has been delivered to a user by means of a telecommunication network. The embodiments will be described in terms of functionality in a "score management node". Although the term score management node is used here, it could be substituted by the term "score management system" throughout this disclosure.

Briefly described, a perception score P is calculated that reflects the user's experience of the service, based on technical network measurements made for one or more events or occasions when the service was delivered to the user, hereafter referred to as "service events" for short. For example, the network measurements may relate to the time needed to download data, the time from service request until delivery, call drop rate, data rate and data error rate.

In the following description, any network measurements related to delivery of a service to the user by means of a telecommunication network are generally denoted "v" regardless of measurement type and measuring method. It is assumed that such network measurements v are available in the network, e.g. as provided from various sensors, probes and counters at different nodes in the network, which sensors, probes and counters are commonly used for other purposes in telecommunication networks of today, thus being operative to provide the network measurements v to the score management node for use in this solution. Key Performance Indicator, KPI, is a term often used in this field for parameters that in some way indicate network performance.

Further, the term "delivery of a service by means of a telecommunication network" may be interpreted broadly in the sense that it may also refer to any service delivery that can be recorded in the network by measurements that somehow reflect the user's experience of the service delivery. Some further examples include services provided by operator personal aided by an Operation and Support System, OSS, infrastructure. For example, "Point of sales" staff may be aided by various software tools for taking and executing orders from users. These tools may also be able to measure KPIs related to performance of the services. Another example is the Customer Care personal in call centers who are aided by some technical system that registers various user activities. Such technical systems may as well make network measurements related to these activities as input to the score management node.

For example, the network measurements v may be sent regularly from the network to the score management node, e.g. in a message using the hyper-text transfer protocol http or the file transfer protocol ftp over an IP (Internet Protocol) network. Otherwise the score management node may fetch the measurements v from a measurement storage where the network stores the measurements. In this disclosure, the term network measurement v may also refer to a KPI which is commonly prepared by the network to reflect actual physical measurements. The concept of KPIs is well-known as such in telecommunication networks.

The perception score P is generated by the score management node as follows and with reference to FIG. 1 which illustrates a score management node 100 which receives network measurements v made in a telecommunication network 102. The network measurements v may be sent from the network 102 more or less in real-time in a "live stream" fashion, e.g. from an Operation & Maintenance, O&M, node or similar, not shown. Alternatively, the network measurements v may be recorded by the network in a suitable storage or database 104, as indicated by a dashed one-way arrow, which can be accessed by the score management node 100, e.g. at regular intervals, as indicated by a dashed two-way arrow.

The received network measurements v can be seen as "raw data" being used as input in this procedure. For example, the above O&M node may be an aggregation point or node for distributed sensors and probes that make measurements in the traffic flows throughout the network. This node may combine, correlate and potentially filter the measurement data, e.g. to produce KPIs or the like.

A quality score Q reflecting the user's perception of quality of a delivered service and an associated significance S reflecting the user's perception of importance of the delivered service, are determined based on the network measurements. In this operation, Q and S may be determined by applying predefined functions on the network measurements, which will be explained in more detail later below. The perception score P is then derived from the quality score Q which is weighted by its associated significance S. Basically, the greater significance S the greater influence has the associated quality score Q on the resulting perception score P.

Before calculating the perception score P, the quality score Q and associated significance S are also modified in this procedure based on a set of predefined influence factors valid for the user and the delivered service. These influence factors may be related to user expectation considering various characteristics of the user, correlation of different service events occurring within a certain time frame, and fading memory of the user which reduces the significance S of a service event over time. The perception score P is then calculated from the modified quality score Q and associated significance S, and the resulting perception score P can then be made available for supporting evaluation of the service. By using this solution, the perception score P can be seen as a model for how the user is expected to perceive the service given the circumstances of the delivered service, which model is based on objective and technical network measurements.

Returning to FIG. 1, the above-mentioned operation of determining Q and S based on the network measurements is performed by a first scoring module 100a in the score management node 100. Next, the operation of modifying Q and S according to the above influence factors is performed by a succession of intermediate scoring modules 100b, 100c . . . in the score management node 100, where each intermediate scoring module modifies Q and/or S based on such an influence factor. In this way, the first scoring module 100a determines Q and S purely from the raw data, i.e. the received network measurements, while the intermediate scoring modules 100b, 100c . . . adjust Q and S by considering the circumstances of the service event which produce the above influence factors, thereby making Q and S more adapted to the actual situation of the delivered service.

Further, the operation of calculating the perception score P from the modified Qm weighted by its associated and modified Sm is performed by a concluding scoring module 100x in the score management node 100. Having generated the resulting perception score P, the score management node 100 makes P available for evaluation of the service, e.g. by saving it in a suitable storage or sending it to a service evaluation system or center, schematically indicated by numeral 106. For example, P may be sent to the service evaluation system or storage in an http message or an ftp message over an IP network. The service evaluation system or storage may comprise an SQL (Structured Query Language) database or any other suitable type of database.

The quality score Q and associated significance S are thus modified gradually in multiple steps by the intermediate scoring modules 100b, 100c . . . such that the output of modified Q' and/or S' from one intermediate scoring module is used as input to the next successive intermediate scoring module for further modification, until the thus processed data reaches the concluding scoring module 100x for calculation of P. It is an advantage that this modular arrangement of scoring modules 100a-x in the score management node 100 is flexible in the sense that any scoring module can easily be added, removed, replaced or modified as desired, without impacting the operation of other modules.

There are several advantages of this solution as compared to conventional ways of obtaining a user's opinion about a service. First, the perception score P is a quite accurate estimation of the users' opinion of the service event considering the prevailing circumstances, and it is possible to obtain P automatically and continuously in real-time, basically after every time a service is delivered to a user. There are thus no restrictions regarding the number of users nor the extension of time which makes it possible to obtain a quite representative perception score P. Second, the perception score P is calculated from technical measurements in the network related to the service usage which are truthful and "objective" as such, also being readily available, thereby avoiding any dependency on the user's memory and willingness to answer a survey or the like. Third, it is not necessary to spend time and efforts to distribute surveys and to collect and evaluate responses, which may require at least a certain amount of manual work.

Fourth, it is possible to gain further knowledge about the service by determining the perception score P selectively, e.g. for specific types of services, specific types of network measurements, specific users or categories of users, and so forth. Fifth, it is also possible to trace a technical issue that may have caused a "bad" experience of a delivered service by identifying which measurement(s) have generated a low perception score P. It can thus be determined when and how a service was delivered to a presumably dissatisfied user, as indicated by the perception score P, and therefore a likely technical shortcoming that has caused the user's dissatisfaction can also be more easily identified. Once found, the technical issue can be eliminated or repaired. Different needs for improvement of services can also be prioritized based on the knowledge obtained by the perception score P. Further features and advantages will be evident in the description of embodiments that follows.

Figure 2:
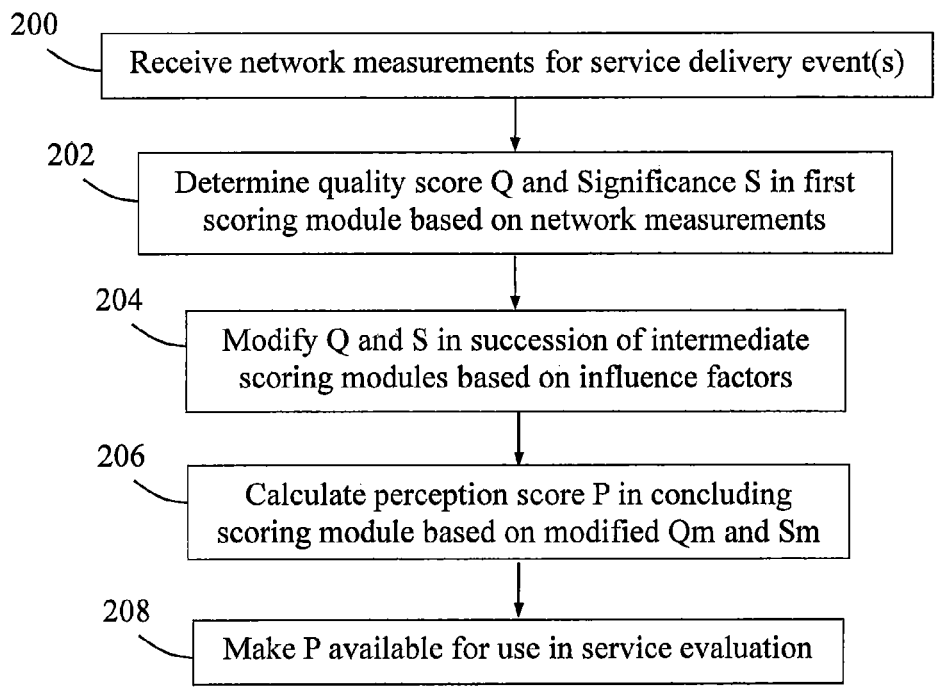
FIG. 2 is a flow chart illustrating a procedure in a score management node, according to further possible embodiments.

An example of how the solution may be employed will now be described with reference to the flow chart in FIG. 2 which illustrates a procedure with actions performed by a score management node, to accomplish the functionality described above. The score management node is operative to supporting service evaluation based on a perception score P reflecting a user's experience of a service delivered by means of a telecommunication network, e.g. in the manner described above for the score management node 100.

A first action 200 illustrates that the score management node receives network measurements related to at least one service event when the service is delivered to the user. This operation may be performed in different ways, e.g. when the network sends a stream of network measurements as they are generated, or by fetching network measurements from a measurement storage, as described above. Action 200 may thus be executed continuously or regularly any time during the course of this process of the following actions. The protocol used in this communication may be the hyper-text transfer protocol http or the file transfer protocol ftp, and the network measurements may be received in a message such as a regular http message or ftp message. In some possible embodiments, the score management node may thus receive the network measurements in a message according to the hyper-text transfer protocol http or the file transfer protocol ftp.

In some further possible but non-limiting embodiments, the network measurements may be related to any of: the time needed to download data, the time from service request until delivery, call drop rate, data rate, and data error rate. In another possible embodiment, the network measurements may be made during a predefined time interval.

In a next action 202, the score management node determines, in a first scoring module, a quality score Q reflecting the user's perception of quality of the delivered service and an associated significance S reflecting the user's perception of importance of the delivered service, based on the received network measurements. As mentioned above, Q and S may be determined by applying predefined functions on the network measurements. For example, Q may be determined by applying a first function Q(v) on the network measurements v, and S may be determined by applying a second function S(v) on the network measurements v. Further, the first and second predefined functions Q(v) and S(v) are dependent on a type of the network measurements used as input to the functions so that a function applied on, say, measurement of data rate is different from a function applied on measurement of call drop rate, to mention two non-limiting but illustrative examples.

In a further action 204, the score management node then modifies, in a succession of intermediate scoring modules, the determined quality score Q and associated significance S of each service event based on a predefined influence factor applied in each intermediate scoring module. This means that Q and S that were determined in the first scoring module as of action 202, or at least one of Q and S, are modified in a first intermediate scoring module based on a first predefined influence factor. The resulting output of the once modified Q' and S' is then used as input to a second intermediate scoring module which modifies Q' and S' further based on a second predefined influence factor. The resulting output of the twice modified Q" and S" may then be used as input to a third intermediate scoring module which modifies Q" and S" further based on a third predefined influence factor, and so forth. The number of intermediate scoring modules and corresponding influence factors is flexible and can thus be two or more depending on the implementation.

In some possible embodiments which may be used for action 204, the predefined influence factors may comprise at least two of:

A) User expectation. In this example, a user profile with characteristics pertaining to the user is defined and at least one user group that matches the user profile is identified. The quality score Q and associated significance S can then be modified based on predefined group-specific parameters valid for the at least one identified user group. The group-specific parameters have thus been defined for a user group to basically describe the user group. Thus, the user can thereby be described by means of membership in one or more of these user groups depending on how relevant the group-specific parameters are to the user.

B) Correlation of different service events. In this example, the significance S of a quality score Q for a first service event is modified by multiplying a correlation factor F reflecting a correlation between the first service event and a second service event when the first and second service events have both occurred within a certain time frame. For example, the correlation factor F may be greater the closer two service events are in time assuming that if one of the events has particularly high significance to the user the other event will also be likely to have high significance to the user if the two service events occur within a short time frame.

C) Fading memory of the user. In this example, the significance S of each quality score Q is reduced over time according to a predefined Significance Reduction Rate, SRR assuming that a user's memory of a service event tends to fade over time and this can be compensated by reducing the significance of the service event over time accordingly. By reducing the significance S over time to simulate the user's fading memory of the service event, the perception score P will likewise be reduced over time. The SRR may be defined to form a step-like function which reduces S in distinct steps over time until it finally reaches zero assuming that the service event is virtually forgotten by the user at this point.

After action 204, Q and S have been modified according to the predefined influence factors as exemplified above and the resulting modified quality score "Qm" and associated significance "Sm" are used as input in the next action 206 where the score management node calculates, in a concluding scoring module, the perception score P based on the modified quality score Qm and associated modified significance Sm. Finally, the calculated perception score P is made available for use in the service evaluation, in an action 208, e.g. by sending P to a suitable service evaluation system or storage, e.g. as indicated by numeral 106 in FIG. 1. The protocol used in this communication may be e.g. the hyper-text transfer protocol http or the file transfer protocol ftp, and the perception score P may be sent to the service evaluation system or storage in an http message or an ftp message over an IP network. The service evaluation system or storage may comprise an SQL (Structured Query Language) database or any other suitable type of database.

In action 206, the perception score P may be calculated according to different possible embodiments as follows. In one possible embodiment, the score management node may calculate the perception score P for multiple service events of service delivery to the user as an average of modified quality scores Qm for the service events weighted by their associated modified significances Sm. In this case, another possible embodiment is that the score management node may calculate the perception score $P_N$ for N service events of service delivery to the user according to the following formula:

$$P_N = \frac{\sum_{n=1}^{N} Q_n S_n}{\sum_{n=1}^{N} S_n}$$

where $Q_n$ is the modified quality score for a service event n and $S_n$ is the associated modified significance for said service event n. In other words, the sum of all N quality scores weighted by their significances is divided by the sum of all the N significances.

It was mentioned above that the network measurements may be made during a predefined time interval. In another possible embodiment, the score management node may update the perception score P after a new service event n based on a previous perception score $P_{n-1}$ calculated for a previous time interval or service event and a quality score $Q_n$ and associated significance $S_n$ determined for the new service event n, according to the following formula:

$$P_n = \frac{P_{n-1} \cdot S_{sum,n-1} + Q_n S_n}{S_{sum,n-1} + S_n}$$

where
$S_{sum,n} = S_{sum,n-1} + S_n$ and $P_n$ is the updated perception score. In this way, the perception score P can be kept up-to-date after each new service event by using the above simple calculation which adds the influence of the new service event n on the total P.

In further possible embodiments, the score management node may identify at least one type of service for which a modified significance S satisfies a threshold condition. If so, the score management node may then provide the identified at least one type of service as input to root cause analysis when the perception score P is changed significantly. The term "root cause analysis" refers to a procedure for tracing a technical reason for why a service has e.g. been delivered poorly, which procedure as such is somewhat outside the scope of this disclosure. In this embodiment the root cause analysis is deemed to be warranted if the perception score P has changed significantly, particularly when P has decreased which indicates that the user is expected to be dissatisfied with the service as shown by the network measurement(s).

The threshold condition is thus used for finding service events of unexpected perception score P, either surprisingly low or high. This also makes it easy to exactly identify individual service events that may have caused a "bad" experience of a delivered service. For example, the threshold condition may require that the modified significance S is high which indicates that the corresponding service event has had a great influence on the changed P. Thereby, the search for a technical reason can be focused on that service event to some extent. Some examples of how such high values of the significance S can be identified and maintained as input for the root cause analysis, will be described in more detail later below with reference to some examples in FIGS. 7-9.

Figure 3:
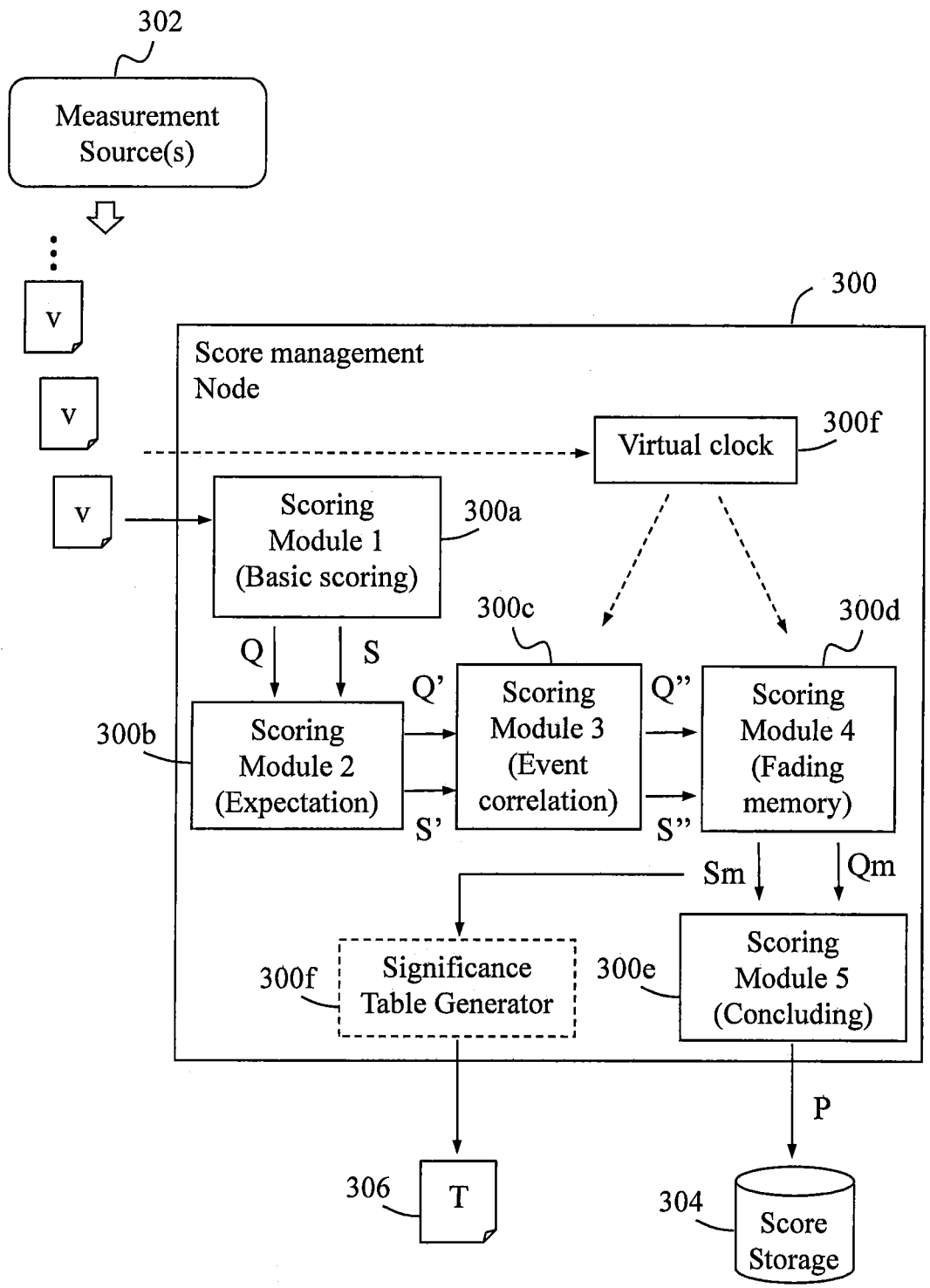
FIG. 3 is a block diagram illustrating another example of how a score management node may operate, according to further possible embodiments.

Another example of how the above-described score management node may be configured to accomplish the solution is illustrated by the block diagram in FIG. 3 which will now be described with further reference to FIG. 2. In this example, a score management node 300 receives various network measurements v from one or more measurement sources 302 which may include an O&M node, a measurement storage, or other suitable entity capable of supplying such network measurements, examples of which have been given above. The network measurements v may be received one by one as a "live stream", or multiple measurements may be received at the same time e.g. at regular intervals. The score management node 300 comprises functionality defined in terms of scoring modules that can be used for implementing the embodiments described herein. This example involves five such scoring modules 300a-e which effectively form a scoring "pipeline" through which the incoming information is processed sequentially as follows.

In the score management node 300, a first scoring module 300a, which may also be referred to as a "basic" scoring module, determines a quality score Q and an associated significance S for the network measurements, e.g. by applying predefined scoring functions on each network measurement v being received as raw input data, as of action 202 described above. Then each basic pair of Q and S can be seen as a first version which is used as input to a succession of intermediate scoring modules 300b-d for modification of Q and S based on a predefined influence factor applied in each intermediate scoring module, as of action 204.

The initial intermediate scoring module 300b modifies the basic Q and S based on the above-described influence factor A related to user expectation, thus producing once modified quality score Q' and significance S'. These modified Q' and S' are then used as input to the next intermediate scoring module 300c which further modifies Q' and S' based on the above-described influence factor B related to correlation of different service events, thus producing twice modified quality score Q" and significance S". These modified Q" and S" are then used as input to the final intermediate scoring module 300d which further modifies Q" and S" based on the above-described influence factor C related to fading memory, thus producing trice modified quality score Qm and significance Sm. The influence factors A-C have been described above.

Thereby, each pair of quality score Q and associated significance S has in this example been modified or "adjusted" with consideration to all the above influence factors A-C, thus making the resulting modified values of Qm and Sm representative to the user according to the current circumstances. Qm and Sm are then used as input to a concluding score module 300e which calculates the resulting perception score P based on the modified quality score Qm and associated modified significance Sm. Some examples of how P can be calculated have been described above. Finally, the calculated perception score P is made available for use in the service evaluation, in this example by storing P in a score storage 304 which can be accessed by a suitable entity, not shown, which is used for carrying out the service evaluation, e.g. in a business and operation support system, BSS/OSS. The service evaluation as such is somewhat outside the scope of the embodiments and examples described herein.

Some examples of how the above-described scoring modules 300a-e, and also any further scoring modules described herein, may be implemented in practice will now be outlined. Each scoring module may be a piece of software executed by a suitable execution platform. This includes the possibility to have all scoring modules compiled into one program. In this example, the scoring modules may be software modules, e.g. in the form of Java classes, that are compiled together into a single piece of software that contains the entire score calculation as exemplified above. A scoring coordinator may be used for controlling the operation of each scoring mode, which will be described in more detail later below with reference to FIG. 5.

Alternatively, a potentially more flexible implementation may be used where the scoring modules are treated as separate services implemented by distinct pieces of software. They could for example be Service-Oriented Architecture, SOA, Web Services. It would also possible to have the scoring modules implemented as "worker nodes" in a stream processing environment such as "Storm". In general, each scoring module is a logical scoring node that can be realized in software and can be either co-deployed on one physical node or separated and deployed into a set of physical processing nodes.

Since the scoring operation in at least some of the intermediate scoring modules 300b-d is dependent on how much time has passed, e.g. after a service event or between two service events, a virtual clock 300f may be employed in the score management node 300 as follows. If the scoring is performed in real-time, or in near real-time, a system clock together with time-stamps that usually come with the raw network measurements can be used to determine the relevant timing. In case the processing is "offline", i.e. based on temporarily stored and retrieved network measurements, the time dependent scoring operation needs to be able to reconstruct the timing involved. This is more complex than simply comparing the difference of time-stamps in the network measurements because the described procedure is a stream-based processing model where one measurement at a time is scored and older measurements are not preserved.

This procedure therefore needs to recreate the real time in which the measured service events occurred, which can be done by the virtual clock 300f recreating "clock ticks" based on timestamps of the received network measurements. If new measurement data is presented for scoring, the virtual clock 300f first checks if the timestamp in the data shows a later or earlier time than the time generated by the virtual clock 300f. If the data timestamp is older, the data can proceed in the sequence of scoring modules.

If the data timestamp is newer by showing a later time than the current virtual clock time, the virtual clock 300f generates clock ticks until its time becomes later than the timestamp of the data. Clock tick intervals and therefore the resolution of the virtual clock 300f can be configured and the clock tick interval may for example be configured to 1 minute. This would mean that all measurement data that has timestamps within a one minute interval will be processed. If some measurement data is presented that shows the next one minute interval, the virtual clock will be ticking first to "catch up", before that data can be processed in the sequence of scoring modules.

It might however happen that several minutes have passed between the time shown in two consecutive timestamps. Then the clock 300f will generate enough ticks until it has "overtaken" the data time again. Each clock tick should be generated because the virtual clock 300f offers a "subscription system" that allows the intermediate scoring modules 300b-d to subscribe for clock notifications about each clock tick interval. In each of the clock tick cycles all these notifications are sent out to the scoring modules 300b-d, as indicated by dashed arrows, and the respective operations are finished before the next clock tick is generated.

Figure 4:
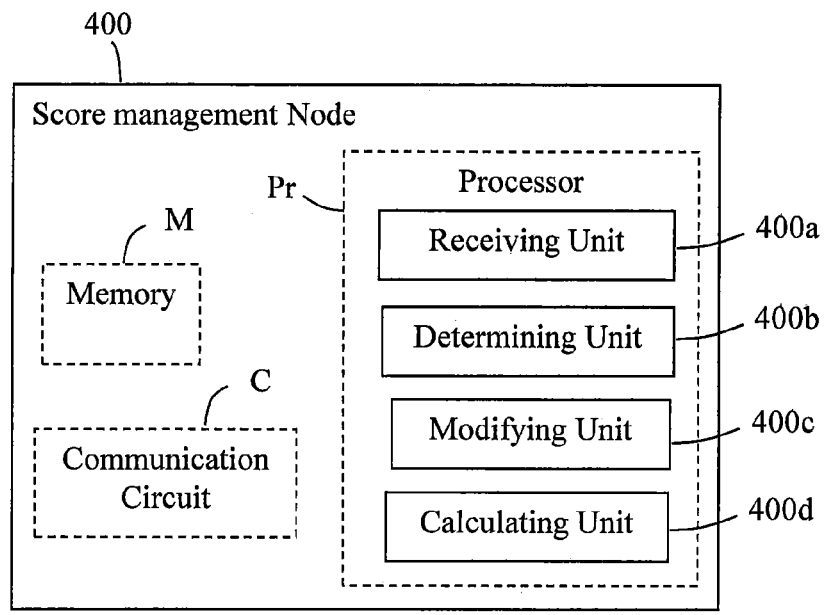
FIG. 4 is a block diagram illustrating a score management node in more detail, according to further possible embodiments.

The block diagram in FIG. 4 illustrates another detailed but non-limiting example of how a score management node 400 may be structured to bring about the above-described solution and embodiments thereof. In this figure, the score management node 400 may thus be configured to operate according to any of the examples and embodiments of employing the solution as described above, where appropriate, and as follows. The score management node 400 in this example is shown in a configuration that comprises a processor "Pr", a memory "M" and a communication circuit "C" with suitable equipment for receiving and transmitting data and messages in the manner described herein.

The communication circuit C in the score management node 400 thus comprises equipment configured for communication with a telecommunication network, not shown, using one or more suitable communication protocols depending on implementation. As in the examples discussed above, the score management node 400 is configured or arranged to perform e.g. the actions of the flow chart illustrated in FIG. 2 in the manner described above. These actions may be performed by means of functional units in the processor Pr in the score management node 400 as follows.

The score management node 400 is arranged to support service evaluation based on a perception score P reflecting a user's experience of a service delivered by means of a telecommunication network. The score management node 400 thus comprises the processor Pr and the memory M, said memory comprising instructions executable by said processor, whereby the score management node 400 is operable as follows.

The score management node 400 is configured to receive network measurements related to at least one service event when the service is delivered to the user. This receiving operation may be performed by a receiving unit 400a in the score management node 400, e.g. in the manner described for action 200 above. The score management node 400 is also configured to determine, in a first scoring module, a quality score Q reflecting the user's perception of quality of the delivered service and an associated significance S reflecting the user's perception of importance of the delivered service, based on the received network measurements. This determining operation may be performed by a determining unit 400b in the score management node 400, e.g. in the manner described for action 202 above.

The score management node 400 is further configured to modify, in a succession of intermediate scoring modules, the determined quality score Q and associated significance S of each service event based on a predefined influence factor applied in each intermediate scoring module. This modifying operation may be performed by a modifying unit 400c in the score management node 400, e.g. in the manner described for action 204 above. The score management node 400 is also configured to calculate, in a concluding scoring module, the perception score P based on the modified quality score Qm and associated modified significance Sm, wherein the calculated perception score P is made available for use in the service evaluation. This calculating operation may be performed by a calculating unit 400d in the score management node 400, e.g. in the manner described for action 206 above.

It should be noted that FIG. 4 illustrates some possible functional units in the score management node 400 and the skilled person is able to implement these functional units in practice using suitable software and hardware. Thus, the solution is generally not limited to the shown structure of the score management node 400, and the functional units 400a-e may be configured to operate according to any of the features described in this disclosure, where appropriate.

The embodiments and features described herein may thus be implemented in a computer program storage product comprising instructions which, when executed on at least one processor, cause the at least one processor to carry out the above actions e.g. as described for any of FIGS. 1-6. Some examples of how the computer program storage product can be realized in practice are outlined below, and with further reference to FIG. 4.

The processor Pr may comprise a single Central Processing Unit (CPU), or could comprise two or more processing units. For example, the processor Pr may include a general purpose microprocessor, an instruction set processor and/or related chips sets and/or a special purpose microprocessor such as an Application Specific Integrated Circuit (ASIC). The processor Pr may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the score management node 400.

Figure 5:
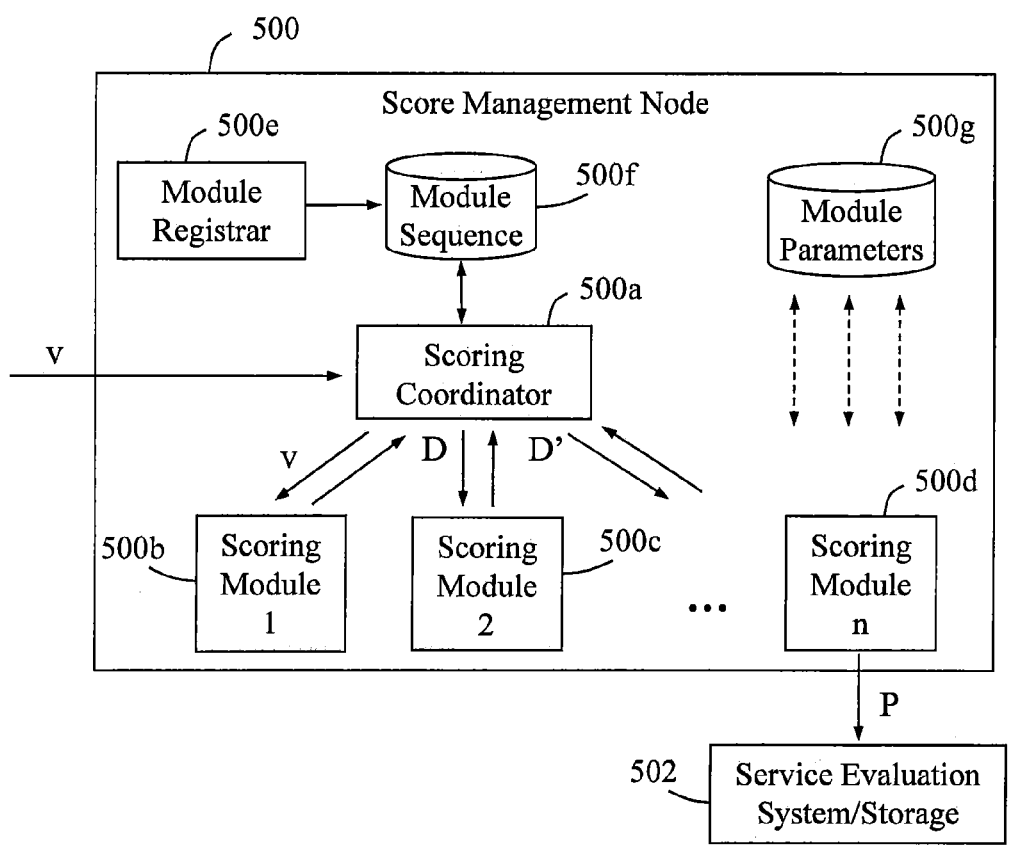
FIG. 5 is a block diagram illustrating yet another example of how a score management node may operate, according to further possible embodiments.

Another example of how the above-described score management node may be configured and operable to accomplish the solution, will now be described with reference to the block diagram in FIG. 5 and also to the flow chart in FIG. 6. It was mentioned above that the operation of scoring modules 300a-d in FIG. 3 may be controlled by a scoring coordinator. An example of how this may be done will now be described. FIG. 5 illustrates an example score management node 500 comprising a scoring coordinator 500a and a series of scoring modules 1-n, denoted 500b-d. In this example, scoring module 500b represents the above-described first scoring module 300a of FIG. 3, scoring module 500c represents the above-described succession of intermediate scoring modules 300b-d of FIG. 3, while scoring module 500d represents the above-described concluding scoring module 300e of FIG. 3.

It is assumed that a module registrar 500e has created a scoring module sequence for processing network measurements made when a specific service type is delivered to a user at different service events. The scoring module sequence thus comprises the scoring modules 500b-d and it is maintained in a suitable sequence storage 500f. The score management node 500 may comprise further scoring modules, not shown, and several different scoring module sequences may be maintained in the sequence storage 500f for different service types. Each network measurement v is first received by the scoring coordinator 500a, as of action 600. In a next action 602, the scoring coordinator 500a reads the scoring module sequence from the storage 500f and sends the network measurement v to the first scoring module 500b of the scoring module sequence, in a following action 604.

When the first scoring module 500b has determined Q and S from the network measurement v, e.g. as of action 202, the scoring coordinator 500a receives Q and S as scoring data D from the first scoring module 500b, in an action 606. In a next action 608, the scoring coordinator 500a again reads the scoring module sequence from the storage 500f to find the next scoring module. The scoring coordinator 500a thus determines if there is any further scoring module in the scoring module sequence, in an action 610. In this case, an intermediate scoring module 500c is found to be next in the sequence and the scoring coordinator 500a accordingly sends the scoring data D to that scoring module 500c for modification, in a following action 612, and scoring module 500c then modifies the scoring data D, e.g. as of action 204.

In another action 614, the scoring coordinator 500a receives the modified scoring data D' from the intermediate scoring module 500c.

The scoring coordinator 500a now repeats the procedure by returning to action 608 to read the scoring module sequence again from the storage 500f. If it is then determined in action 610 that there is a further scoring module in the sequence, the scoring coordinator 500a accordingly sends the scoring data D' to the next scoring module in action 612 for further modification and receives modified scoring data in action 614.

After repeating actions 608-614 a number of times, all scoring modules in the score management node 500 have been identified and used, the last scoring module being the concluding scoring module 500d which calculates the resulting perception score P, e.g. as of action 206, and the scoring coordinator 500a eventually determines in action 610 that there is no further scoring module in the scoring module sequence. The procedure then ends when the final result, i.e. the calculated perception score P, is stored in a suitable service evaluation system or storage 502, as shown in a final action 616, e.g. as of action 208. For example, the concluding scoring module 500d may itself store P in storage 502, as indicated in FIG. 5, or P may be delivered to the scoring coordinator 500a which in turn stores P.

As described above, the concluding scoring module calculates the perception score P based on the modified quality score Qm and associated modified significance Sm, which may be done for multiple service events of service delivery to the user as an average of modified quality scores Qm for the service events weighted by their associated modified significances Sm. In action 616, the concluding scoring module 500d may thus update an already stored value of P after each new service event having generated a network measurement that is processed according to FIG. 6.

Each scoring module 1-n thus processes input information and in these operations they use and apply certain operational parameters and/or formulas, e.g. as described above for respective modules. The operational parameters and/or formulas are denoted "module parameters" for short which may be maintained in a parameter storage 500g that is accessed by the scoring modules 500b-d when executing their respective scoring operations.

It was mentioned above that the score management node may identify at least one type of service for which a modified significance S satisfies a threshold condition, and that the identified at least one type of service may then be provided as input to root cause analysis when the perception score P is changed significantly. Examples of how this can be done will now be described. It is assumed that the resulting modified significance S can be detected and collected, e.g. the output from the last intermediate scoring module 100c or 300d being the modified significance Sm, in order to generate a table with services that have generated the highest significances as follows.

The final modified significance S of a single service event may thus be used in order to determine what type of service did get the highest overall significance. In this case the significances determined for a certain service type are summed up and the sum value is stored. In this way, a significance table can be built that shows which types of services did have the highest significance in the calculation of the perception score. The significance table can be sorted according to the significance sums resulting in a list with the most significant service event on top of the list. This shows what type of service has produced the highest weight in the calculation of the perception score P.

Figures 6, 7:
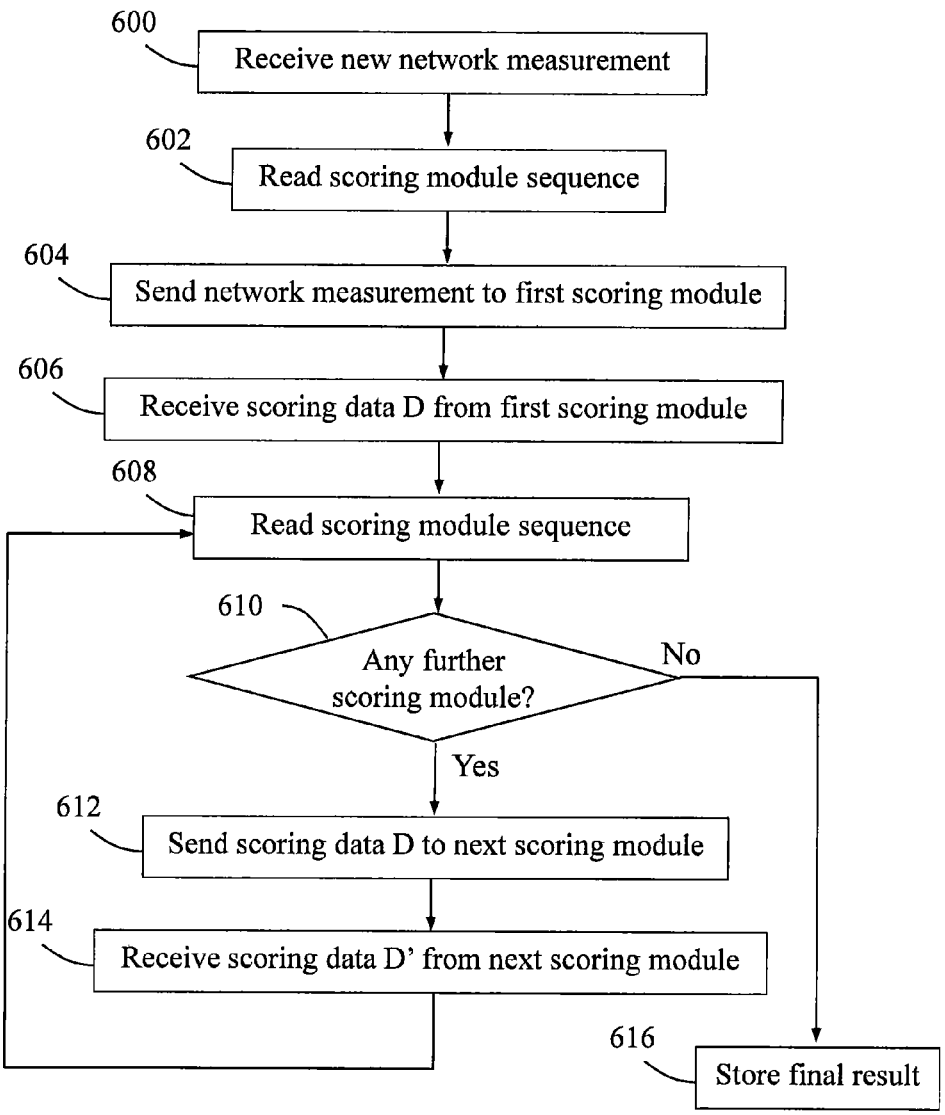
FIG. 6 is a flow chart illustrating another example of a procedure in a score management node, according to further possible embodiments.
FIG. 7 is a table with examples of how significance S can be determined for different service types, according to further possible embodiments.

An example of such a significance table is shown in FIG. 7 with entries for different service types and their resulting significance sum, the number of scorings of service events and a calculated average of the significance for all service events. Whenever a new scoring for a service type Tx with a significance S is obtained, S is added to the significance sum S_Tx of the service type Tx. In this table, also the number of scorings and the average significance are kept for each service type. This provides further information indicating whether the significance of a service type is coming from a small number of very significant service events or from a large number of less significant ones. This may provide further insights into the service event history of the user and the root cause for the perception score.

A table like this is associated with the perception score P. Thus for every perception score P, a table of the most significant experience events can be made available. As similar to the perception score P, this table is user specific and this kind of table can be generated for each user.

It may be of interest to find out why the perception score P has increased or declined, and this significance table can indicate what types of services had the greatest influence on changes in the perception score. Further investigations in the root cause analysis can then focus on these service types accordingly.

Returning to FIG. 3, a significance table generator 300f is illustrated which extracts the modified significance Sm and other related information from the output of the final intermediate scoring module 300d. The significance table generator 300f then generates a significance table 306, e.g. similar to the table of FIG. 7, which can be accessed by a service evaluation system in order to perform the root cause analysis based on the information in the significance table 306. The significance table may be reset regularly, e.g. once a day, and then re-built from scratch. Thereby, only recent significances will occur in the significance table. If it is desirable to investigate longer time periods, each generated single day table may be stored and a "multi-day" table can easily be calculated by summing up the entries from multiple single day tables. Manual root cause analysis time and therefore costs can be saved because this arrangement of significance table(s) allows to get automatic indications of where to focus the root cause analysis.

The significance table may require a minimum significance threshold. This would only allow service events with high significance exceeding the minimum significance threshold to be in the significance table. In a possible embodiment, the above-mentioned threshold condition may thus dictate that the modified significance S is above a predefined threshold value. In this case the number of entries in the significance table may vary depending on how many service events fulfil the threshold condition.

In another possible embodiment, the threshold condition may alternatively dictate that the modified significance S is above a lowest value of modified significances S for a set of previously identified service types. FIG. 8 is a significance table illustrating an example of how this embodiment may be employed. Generally, a significance table of the n most significant single service events may be maintained with certain related information. n=10 would mean that the 10 most significant events are maintained in the significance table. If a new service event is scored that gets a higher significance S than the least significant service event in the significance table, the least significant service event is deleted and the new one is added to the significance table. Further, this significance table of the n most significant service events can be archived and reset regularly.

It is thus possible to generate a table of individual significant service events comprising detailed information related to the n most significant service events. If n is 10, this means the 10 most significant events are kept with related information including service type, significance S, time of the event, and a parameter called Key Performance Indicator, KPI, which is a term often used for parameters that in some way indicate network performance. The KPI thus corresponds to the above-described network measurements v. If a service event is scored that is more significant than the least significant one in the table, the data of the new service event is added to the table.

The relevant event information in this table may also include a timestamp of the service event and the related KPI and measurements. Details related to the scoring procedure may also be preserved, e.g. including the influence factors and parameters applied by the scoring modules to modify the significance. This allows detailed understanding and improvement of the scoring process.

The significance table in FIG. 8 comprises information about n=5 most significant service events. If a service event with significance greater than 9 is scored, the last service event in the table concerning a video session at time 11:10 will be deleted and the new service event will be added to the table. Also, this table can be reset regularly while the old values are moved to a suitable table storage or archive.

In further possible embodiments, the score management node may identify the at least one type of service based on an average significance determined for one or more of: a certain access technology, a certain device type or manufacturer, and a certain cell identity. These embodiments are exemplified by the significance table in FIG. 9. In this table, the significance is not exclusively tied to individual service events. Further criteria are used here in order to calculate significance sums. For example, the raw network measurements might contain information about the user's device type and device manufacturer. Also, the access type for wireless communication, e.g. 2G, 3G, LTE or Wifi, or a cell identity might be known and used. These factors may provide further dimensions to maintain significance sums.

The significance table in FIG. 9 illustrates an example of how some of the above factors may be used as criteria for generating the significance table. In this example, the significance information is related to device type used by the user, and also features of the network including access type used for the service events and the cell where the service events took place. Each single service event and its significance are added once to each of the sub-tables. The creation of the tables exemplified by FIGS. 7-9 may be hard coded or simple rules may be used that connect a reported property like a cell ID to a new table.

While the solution has been described with reference to specific exemplifying embodiments, the description is generally only intended to illustrate the inventive concept and should not be taken as limiting the scope of the solution. For example, the terms "score management node", "scoring module", "perception score", "quality score", "significance", "service event", "threshold condition" and "significance table" have been used throughout this disclosure, although any other corresponding entities, functions, and/or parameters could also be used having the features and characteristics described here. The solution is defined by the appended claims.

The invention claimed is:

1. A method performed by a score management node, comprising a processor and a memory containing instructions executable by the processor, for supporting service evaluation by obtaining a perception score P reflecting a user's experience of a service delivered by means of a telecommunication network, the method comprising the steps performed by the score management node:
   receiving network measurements related to at least one service event when the service is delivered to the user,
   determining, in a first scoring module, a quality score Q reflecting the user's perception of quality of the delivered service and an associated significance S reflecting the user's perception of importance of the delivered service, based on the received network measurements,
   modifying, in a succession of intermediate scoring modules, the determined quality score Q and associated significance S of each service event based on a predefined influence factor applied in each intermediate scoring module, and
   calculating, in a concluding scoring module, the perception score P based on a modified quality score Qm and an associated modified significance Sm, wherein the calculated perception score P is made available for use in the service evaluation,
   wherein the score management node calculates a perception score $P_N$ for N service events of service delivery to the user as $$P_N = \frac{\sum_{n=1}^{N} Q_n S_n}{\sum_{n=1}^{N} S_n}$$

where $Q_n$ is a modified quality score for the service event n and $S_n$ is an associated modified significance for the service event n.

2. The method according to claim 1, wherein the score management node calculates the perception score P for multiple service events of service delivery to the user as an average of modified quality scores Qm for the events weighted by their associated modified significances Sm.

3. The method according to claim 1, wherein the network measurements are related to any of: a time needed to download data, a time from service request until delivery, a call drop rate, a data rate, and a data error rate.

4. The method according to claim 1, wherein the network measurements are made during a predefined time interval.

5. The method according to claim 4, wherein the score management node updates the perception score P after a new service event n based on a previous perception score $P_{n-1}$ calculated for a previous time interval or service event and the quality score $Q_n$ and the associated significance $S_n$ determined for the new service event n, as $$P_n = \frac{P_{n-1} S_{sum,n-1} + Q_n S_n}{S_{sum,n-1} + S_n}$$

where
$S_{sum,n} = S_{sum,n-1} + S_n$ and $P_n$ is an updated perception score.

6. The method according to claim 1, wherein the predefined influence factor comprise at least two of:
   an user expectation wherein a user profile with characteristics pertaining to the user is defined and at least one user group that matches the user profile is identified, and wherein the quality score Q and associated significance S are modified based on group-specific parameters valid for the at least one identified user group,
   a correlation of different service events wherein the significance S of a quality score Q for a first service event is modified by multiplying a correlation factor F reflecting a correlation between the first service event and a second service event when the first and second service events have both occurred within a certain time frame, and
   a fading memory of the user wherein the significance S of each quality score Q is reduced over time according to a predefined significance reduction rate, SRR.

7. The method according to claim 1, wherein the score management node identifies at least one type of service for which the modified significance $S_m$ satisfies a threshold condition, and provides the identified at least one type of service as input to a root cause analysis when the perception score P is changed significantly.

8. The method according to claim 7, wherein the threshold condition dictates that the modified significance $S_m$ is above a predefined threshold value.

9. The method according to claim 7, wherein the threshold condition dictates that the modified significance $S_m$ is above a lowest value of modified significances $S_m$ for a set of previously identified service types.

10. The method according to claim 7, wherein the score management node identifies the at least one type of service based on an average significance determined for one or more of:
   a certain access technology,
   a certain device type or manufacturer, and
   a certain cell identity.

11. The method according to claim 1, wherein the score management node receives the network measurements in a message according to the hyper-text transfer protocol http or the file transfer protocol ftp.

12. A score management node arranged to support service evaluation by obtaining a perception score P reflecting a user's experience of a service delivered by means of a telecommunication network, the score management node comprising a processor and a memory containing instructions executable by the processor, whereby the score management node is configured to:
   receive network measurements related to at least one service event when the service is delivered to the user,
   determine, in a first scoring module, a quality score Q reflecting the user's perception of quality of the delivered service and an associated significance S reflecting the user's perception of importance of the delivered service, based on the received network measurements,
   modify, in a succession of intermediate scoring modules, the determined quality score Q and associated significance S of each service event based on a predefined influence factor applied in each intermediate scoring module, and
   calculate, in a concluding scoring module, the perception score P based on a modified quality score Qm and an associated modified significance Sm, wherein the calculated perception score P is made available for use in the service evaluation,
   wherein the score management node calculates a perception score $P_N$ for N service events of service delivery to the user as $$P_N = \frac{\sum_{n=1}^{N} Q_n S_n}{\sum_{n=1}^{N} S_n}$$

where $Q_n$ is a modified quality score for the service event n and $S_n$ is an associated modified significance for the service event n.

13. The score management node according to claim 12, wherein the score management node is configured to calculate the perception score P for multiple service events of service delivery to the user as an average of modified quality scores Qm for the events weighted by their associated modified significances Sm.

14. The score management node according to claim 12, wherein the network measurements are related to any of: a time needed to download data, a time from service request until delivery, a call drop rate, a data rate, and a data error rate.

15. The score management node according to claim 12, wherein the network measurements are made during a predefined time interval.

16. The score management node according to claim 15, wherein the score management node is configured to update the perception score P after a new service event n based on a previous perception score $P_{n-1}$ calculated for a previous time interval or service event and the quality score $Q_n$ and the associated significance $S_n$ determined for the new service event n, as $$P_n = \frac{P_{n-1}S_{sum,n-1} + Q_n S_n}{S_{sum,n-1} + S_n}$$

where
$S_{sum,n} = S_{sum,n-1} + S_n$ and $P_n$ is an updated perception score.

17. The score management node according to claim 12, wherein the predefined influence factor comprise at least two of:
- an user expectation wherein a user profile with characteristics pertaining to the user is defined and at least one user group that matches the user profile is identified, and wherein the quality score Q and associated significance S are modified based on group-specific parameters valid for the at least one identified user group,
- a correlation of different service events wherein the significance S of a quality score Q for a first service event is modified by multiplying a correlation factor F reflecting a correlation between the first service event and a second service event when the first and second service events have both occurred within a certain time frame, and
- a fading memory of the user wherein the significance S of each quality score Q is reduced over time according to a predefined significance reduction rate, SRR.

18. The score management node according to claim 12, wherein the score management node is configured to identify at least one type of service for which the modified significance $S_m$ satisfies a threshold condition, and to provide the identified at least one type of service as input to a root cause analysis when the perception score P is changed significantly.

19. The score management node according to claim 18, wherein the threshold condition dictates that the modified significance $S_m$ is above a predefined threshold value.

20. The score management node according to claim 18, wherein the threshold condition dictates that the modified significance $S_m$ is above a lowest value of modified significances $S_m$ for a set of previously identified service types.

21. The score management node according to claim 18, wherein the score management node is configured to identify the at least one type of service based on an average significance determined for one or more of:
- a certain access technology,
- a certain device type or manufacturer, and
- a certain cell identity.

22. The score management node according to claim 12, wherein the score management node is configured to receive the network measurements in a message according to the hyper-text transfer protocol http or the file transfer protocol ftp.

23. A computer program storage product comprising instructions which, when executed on at least one processor, cause the at least one processor to carry out the method according to claim 1.

* * * * *